June 8, 1954  R. HOLLINGER  2,680,607
PIPE-CUTTING MACHINE
Filed Oct. 16, 1950  9 Sheets-Sheet 2

Inventor:
Richard Hollinger
by his Attorneys
Howson & Howson

Inventor:-
Richard Hollinger
by his Attorneys
Howson & Howson

June 8, 1954     R. HOLLINGER     2,680,607
PIPE-CUTTING MACHINE
Filed Oct. 16, 1950     9 Sheets-Sheet 6

Inventor:
Richard Hollinger
by his Attorneys
Howson & Howson

Patented June 8, 1954

2,680,607

UNITED STATES PATENT OFFICE 2,680,607

PIPE-CUTTING MACHINE

Richard Hollinger, New Cumberland, Pa., assignor to Central Iron & Steel Company, Harrisburg, Pa., a corporation of Pennsylvania Application October 16, 1950, Serial No. 190,365

9 Claims. (Cl. 266—23)

This invention relates to improvements in pipe cutting machines and more particularly in machines of the type adapted to cut pipe of relatively large diameters by means of oxy-acetylene or other cutting torches.

A primary object of the invention is to provide a generally improved machine of this type, exhibiting efficiency, relative simplicity of mechanical form and a high degree of flexibilty in the form and number of the cuts that can be produced in a single operation.

Another object of the invention is to provide a pipe cutting machine of the stated type which is adapted to make simultaneous cuts in one or in a number of pipe sections utilizing a plurality of independently movable torch elements and thereby effecting relatively high production.

Another object of the invention is to provide a machine of the stated type wherein the drive means automatically compensates for pipes of differing diameters.

A still further object of the invention is to provide a pipe cutting machine so constructed that the cutting operation is not materially affected by off-round condition of the work.

The invention further contemplates a pipe cutting machine having improved and simplified means for setting the elements to produce differents forms of cut.

Still another and specific object of the invention is to provide a machine which is well adapted to the production of pipe fittings such as T's, L's, and the like, and wherein all or a number of the component elements of the individual fitting may be produced from a single pipe section in a single or continuous operation of the machine.

The invention resides further in certain structural and mechanical features and details hereinafter described, and illustrated in the attached drawings, wherein:

Fig. 1 is a view in perspective of a pipe cutting machine made in accordance with the invention;

Fig. 27 is a form of pipe fitting, the elements of which may be produced in a single operation on the machine of the present invention;

Fig. 28 is a diagrammatic view showing the character of the simultaneous cuts required to produce a joint of the character illustrated in Fig. 27;

Figures 1, 27, 28, 35:
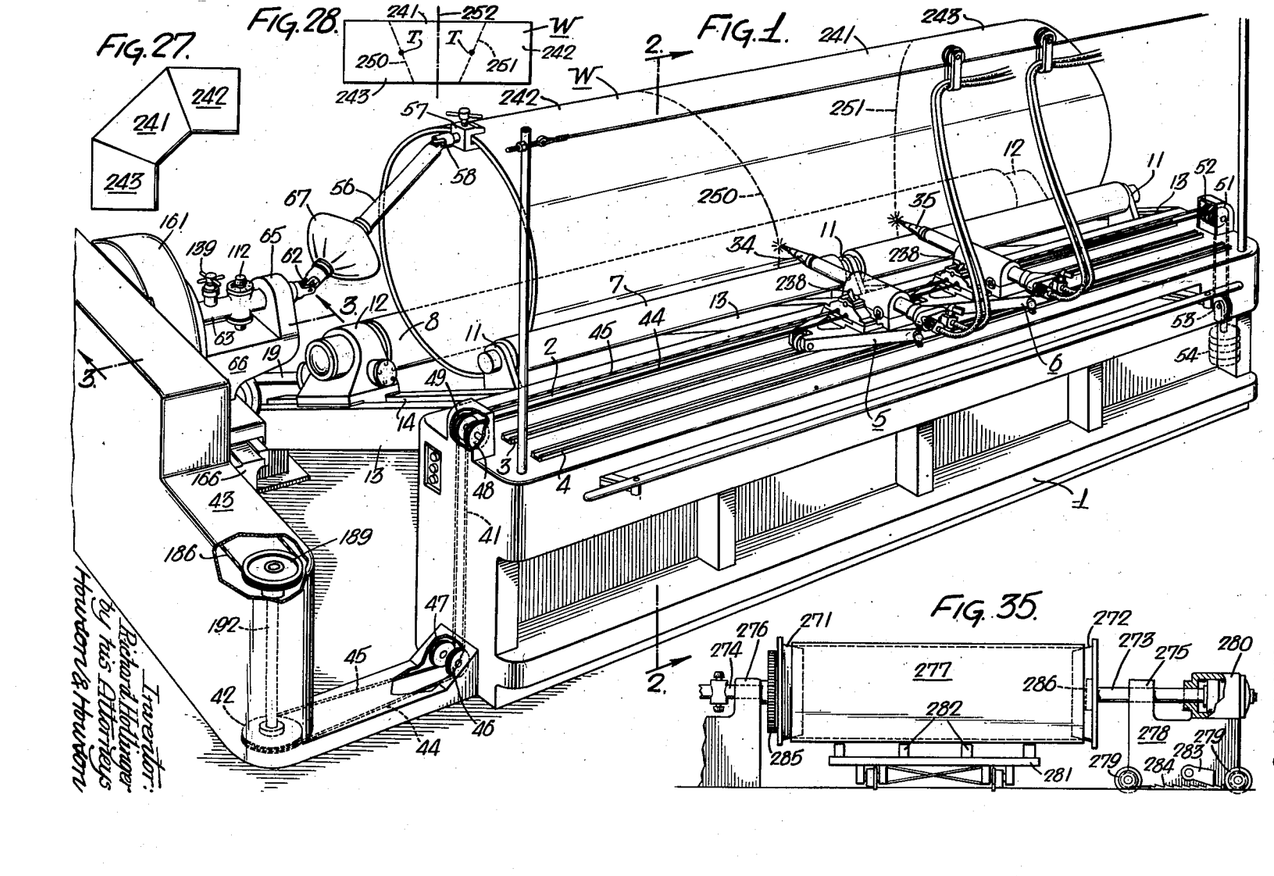
Figures 2, 29, 30:
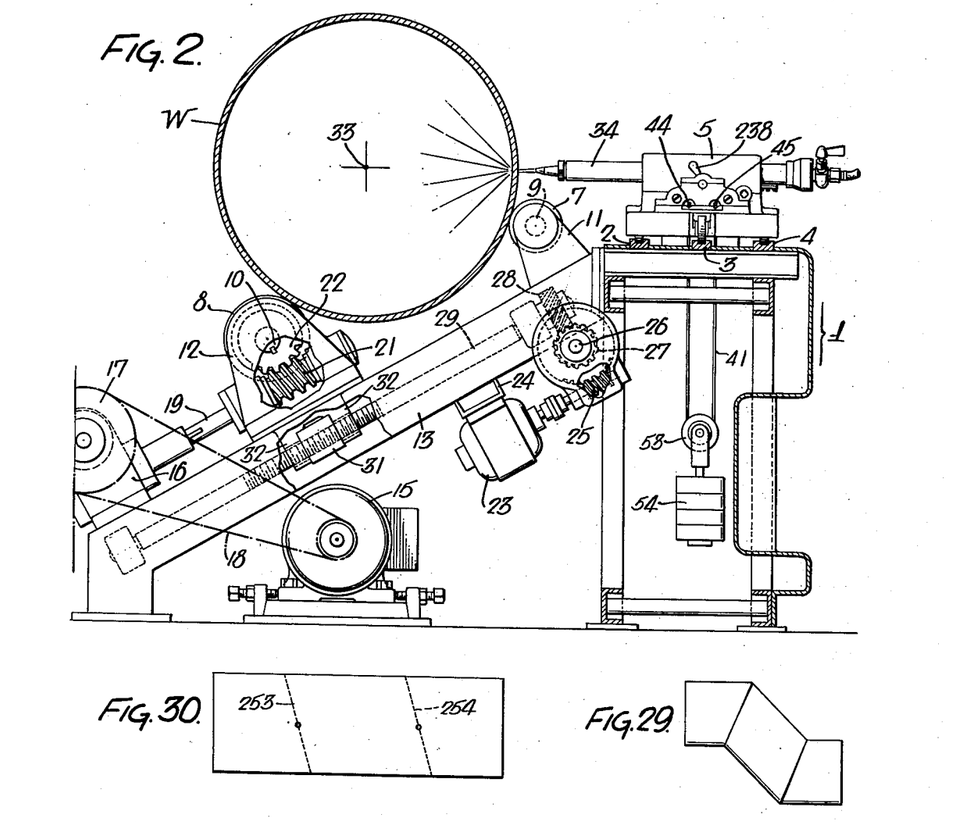
Fig. 2 is a transverse sectional view on the line 2—2, Fig. 1.
Figs. 29, 31 and 33 are diagrammatic views illustrating other forms of pipe fitting.
Figs. 30, 32 and 34 are diagrammatic views illustrating the form of the cuts in a single pipe section required to produce the elements forming the fittings illustrated in Figs. 29, 31 and 33 respectively; and, Fig. 35 is a side elevational view illustrating a modification within the scope of the invention.

With reference to the drawings, the machine comprises a suitable frame or bed 1, at the top of which are mounted three rails 2, 3 and 4 which constitute guides for the burner carriages. In the present instance the carriages are two in number, designated respectively by the reference numerals 5 and 6. The work, shown in the present instance as a pipe section W of relatively large diameter, is supported to one side of the bed 1 on rollers 7 and 8, these rollers being supported in journals 11 and 12 respectively which are supported on three inclined frame members 13 at each end and at the mid section respectively of the bed 1. One of the journals 11 is fixed at the upper end of each of the inclined members 13; and the journals 12 are slidably mounted in suitable guides 14 in the tops of the respective members 13 as illustrated in Figs. 1 and 2. As shown, the rollers 7 and 8 are mounted on shafts 9 and 10 substantially coextensive with the bed 1.

The roller 8 is driven from a motor 15, see Fig. 2, through a gear reduction unit 16 mounted at the lower end of one of the inclined members 13, said unit being connected to the motor by way of a sprocket 17 and chain 18, and being connected to the roller 8 by way of a shaft 19, a worm 21 on said shaft, and a worm wheel 22 which is keyed to the roller shaft 10. Since the roller 8 is adjustable longitudinally of the members 13, the shaft 19 has splined telescoping sections, or is otherwise constructed for axial expansion and contraction so as to maintain the operative connection between the unit 16 and the roller 8 intact, regardless of the adjusted position of the latter.

Adjustment of the journals 12 in the guide 14 is effected in the present instance through a medium of an electric motor 23 which is mounted on a transverse member 24 secured to the under side of the intermediate member 13, this motor being connected through suitable gearing 25 to a shaft 26 which extends under and between the inclined members 13 and which carries helical pinions 27 which mesh with helical gears 28 at the upper ends of shafts 29 suitably journaled in the inclined members 13. As shown in Fig. 2, the shafts 29 are threaded and carry nuts 31 confined between bifurcations 32, 32 on the under sides of the journal structures 12. Rotation of the shafts 29 causes the journals 12 to be adjusted simultaneously in the inclined members 13 in obvious manner.

With the foregoing construction it will be apparent that the work element W, supported on the rollers 7 and 8 as illustrated in Figs. 1 and 2, will be rotated about its own axis as a result of rotation of the roller 8 but at a speed lower than that of the roller. For purposes hereinafter described, the location of the work supporting rollers 7 and 8 is such that the work pipe may be supported with its geometrical axis 33 in a horizontal plane which also includes the longitudinal axes of burners 34 and 35 mounted respectively on the carriages 5 and 6.

In order to effect movements of the burner carriages 5 and 6 longitudinally of the work and simultaneously with the rotation of the work, thereby to obtain cuts in the work in planes diagonal to the rotary axis of the work, I provide an endless conveyor 41 which takes the form in the present instance of a wire cable. As illustrated in Figs. 1 and 2, this endless cable is trained about an actuating pulley 42 mounted in a housing 43, as hereinafter more fully described. The opposite runs 44 and 45 of the cable then pass under idler pulleys 46 and 47 respectively, and upwardly at the end of the bed 1; then over idler pulleys 48 and 49 respectively and longitudinally over the upper surface of the bed 1 and the rails 2, 3 and 4 to the opposite end of the bed where they pass over pulleys 51 and 52 and downwardly to and around a pulley 53. From this pulley is suspended a weight 54 which, supported in the end loop of the cable, acts to tension the cable in obvious manner.

Means is provided as hereinafter described for slidably clamping carriages 5 and 6 independently and selectively to the respective runs of 44 and 45 of the conveyor cable 41; and when so attached the carriages will move on the rails 2, 3, and 4 in a direction corresponding to the direction of movement of the particular run of the cable to which it may be attached. If the carriages 5 and 6 are secured to the same run, they will move in the same direction, and if attached respectively to different runs they will then be moved in opposite directions. In either event the movements of the carriages will be uniform and parallel to the rotary axis of the work, and the tips of the burner nozzles 34 and 35 will be presented to the work in a horizontal plane containing the axis 33 of the work pipe, as previously described.

Figures 24, 25, 26:
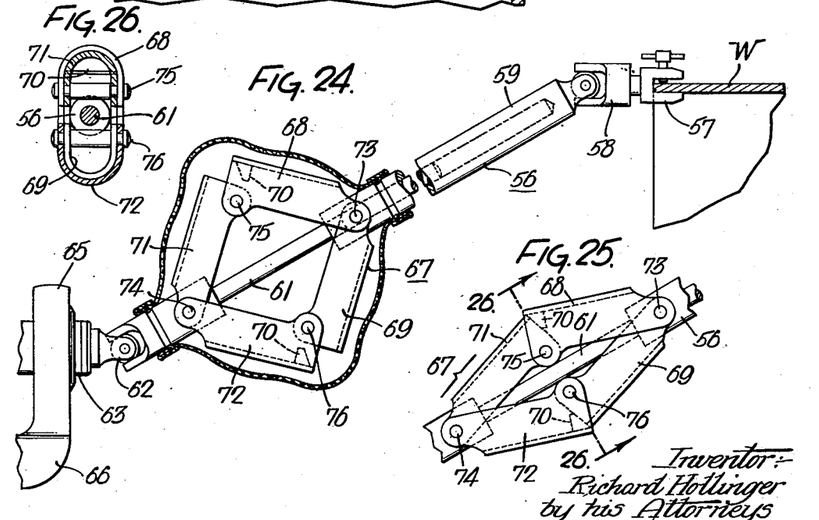
Fig. 24 is a fragmentary side elevational view partly in section showing details of an element of the transmission mechanism.
Fig. 25 is an enlarged fragmentary elevational view showing the toggle elements of Fig. 24, in an extended position.
Fig. 26 is a sectional view on the line 26—26, Fig. 25.

In order to insure synchronization of the rotary movement of the work W and of the burner carriages 5 and 6, transmission means is provided extending from the pulley 42 to the rotary workpiece W. This transmission train is housed in major part in casing 43. It consists of a shaft 56 which is secured at one end to the proximate edge of the work pipe, as best illustrated in Fig. 24, through the medium of a clamp 57 and a universal joint 58. The shaft 56 comprises a hollow section 59, one end of which adjoins the joint 58, and a section 61 which extends slidably into the bore of the section 59. The inner shaft section 61 is connected at its other end by way of a universal joint 62 to a hollow cylindrical tube 63 which is journaled for rotation in an anti-friction bearing 64 in a journal 65, said journal being formed in a bracket 66 adjustably mounted in a guideway 30 in frame 166, see Fig. 3. The bracket 66 carries a shaft 36 provided with a pinion 37 and hand wheel 38, the pinion engaging a rack 39 fixed in the frame 166 and providing means for adjusting the bracket in the guideway 30 at right angles to the axis of the tube 63. A cam-locking device is provided at 40 for locking the shaft 36 and hence the pinion 37 in the bracket, and thereby locking the bracket in the frame 166.

The shaft 56 comprises also a toggle-like linkage best shown in Figs. 24 and 25 and designated generally by the reference numeral 67. This linkage comprises four arms designated respectively by the reference numerals 68, 69, 71 and 72, the arms 68 and 69 being pivotally secured together and to the end of the shaft section 59 by a pin 73; and the arms 71 and 72 being similarly pivotally secured together and to the shaft section 61 by a pin 74. The other ends of the arms 68 and 69 are pivotally secured respectively to the proximate ends of the arms 71 and 72 by way of pins 75 and 76 respectively. The joints which include the pins 73, 74, 75 and 76 are such that while affording freedom for relative angular movements for the connected parts preclude other movements being devoid of play and forming a tight operative connection between the shaft sections 56 and 61 so that there is no looseness between these sections. Stops 70, 70, provided on arms 68 and 72 prescribe limit of movement in one direction. This shaft construction affords substantial elongation and axial contraction of the shaft 56 while maintaining the aforesaid tight connection between the relatively movable shaft sections. The cross-sectional form of the arms 68, 69, 71 and 72 is shown in Fig. 26.

Figure 3:
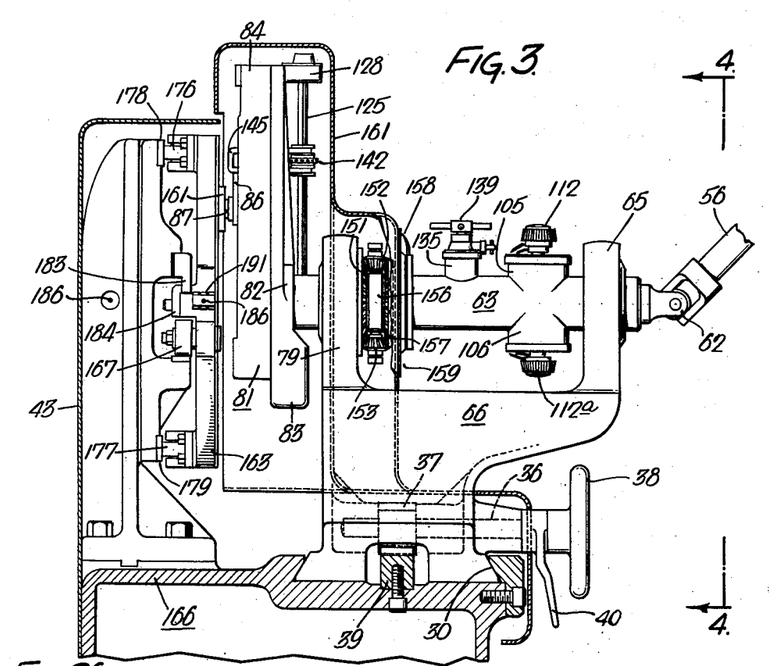
Fig. 3 is a sectional view on the line 3—3, Fig. 1.
Figures 6, 7, 8:
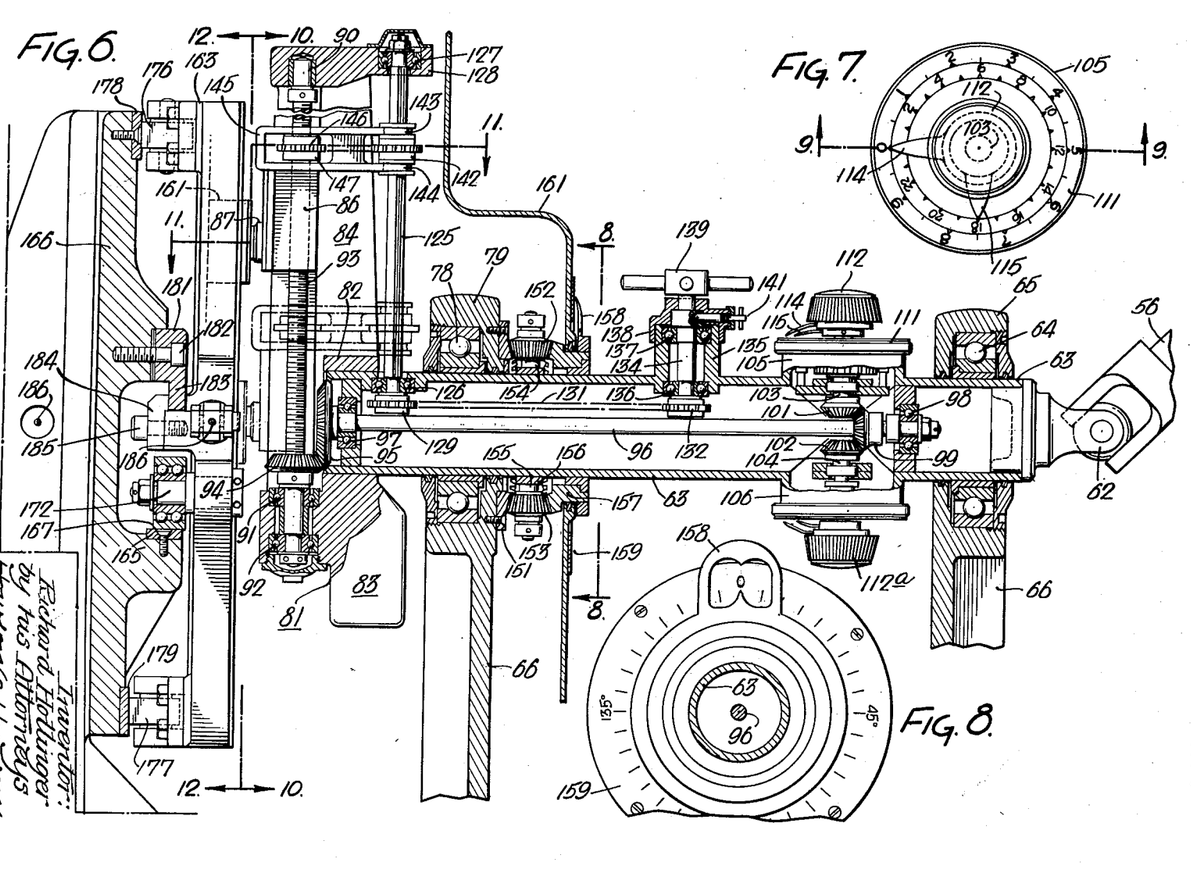
Fig. 6 is a sectional view on the line 6—6, Fig. 4.
Fig. 7 is an enlarged top plan view of the adjusting device illustrated in Fig. 9.
Fig. 8 is a sectional view on the line 8—8, Fig. 6.
Figures 9, 10:
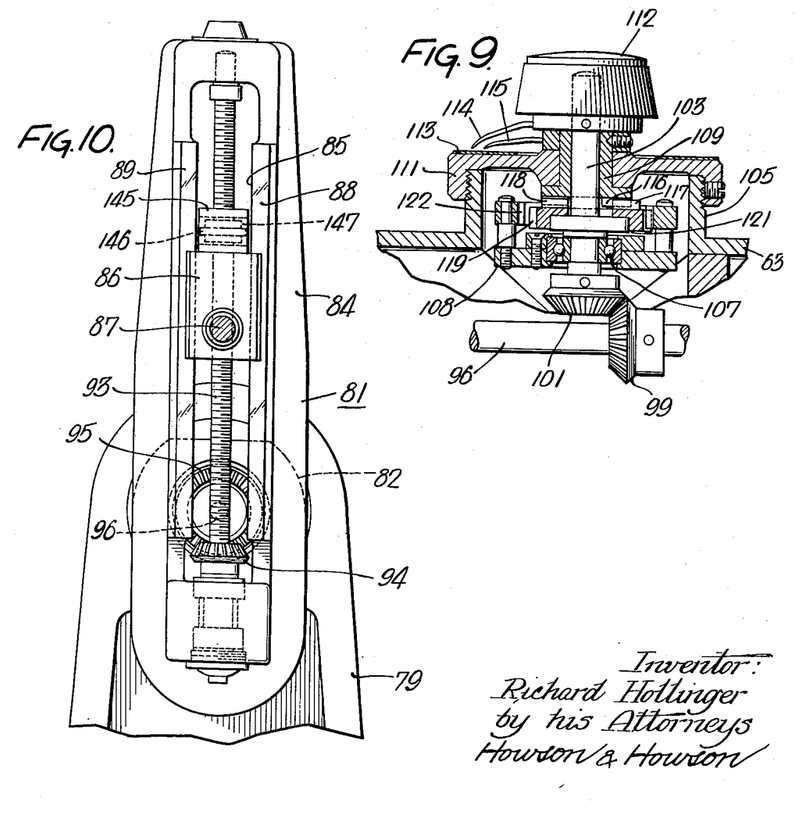
Fig. 9 is a section on the line 9—9, Fig. 7.
Fig. 10 is a sectional view on the line 10—10, Fig. 6.

As previously stated, one end of the tube 63 is supported in the bearing 64. The other end of this tube is supported in a bearing 78 mounted in a journal 79 on the bracket 66. The inner end of the tube 63 carries a crank arm structure designated generally by the reference numeral 81. The form of this crank arm structure is best illustrated in Figs. 3, 6 and 10. As therein illustrated, the structure comprises a portion 82 which embraces and is secured to the inner end of the tube 63, this portion 82 of the arm structure including a counterweight 83. The structure further comprises an arm 84 which extends radially with respect to the axis of the tube 63 and which, as best shown in Fig. 10, is provided with a longitudinal slot 85. In this slot is slidably supported a block 86 which carries a crank pin 87. The block 86 is grooved at its sides for reception of guide rails 88 and 89 at opposite sides respectively of the slot 85.

Supported in bearings 91 and 92 in the lower end of the arm 84 is a radially disposed shaft 93, this shaft extending upwardly through the slot 85 in the arm and being journaled at its upper end in a bearing 90 in the outer end of the arm. This shaft passes through a threaded opening in the block 86 and is itself threaded for operative engagement with the threads of the block whereby rotation of the shaft will cause the block to move longitudinally in the slot 88. In this manner the throw of the crank pin 87 i. e. the distance of the axis of the pin from the axis of the tube 63 may be adjusted.

The shaft 93 may be rotated through the medium of a bevel pinion 94 which is secured to the lower end of the shaft at a point immediately above the bearing 91, and a bevel gear 95 which meshes with the pinion 94 and which is secured to the end of a shaft 96 which extends axially within the tube 63 and which is supported in bearings 97 and 98 in the latter. The opposite end of the shaft 96 carries a bevel pinion 99 which meshes with a pair of bevel gears 101 and 102 which are connected respectively to radial pins 103 and 104 journaled for rotation in cylindrical projections 105 and 106 on opposite sides of the tube 63. As best shown in Fig. 9, the pin 103 is journaled at its inner end in a bearing 107 which is supported in a relatively fixed member 108 extending transversely between the walls of the cylindrical housing 105; the upper end of the pin is supported in a sleeve 109 which is rotatably mounted in the removable cover member 111 of the extension 105. To the outer end of the pin 103 is secured a knob 112 by means of which the pin may be rotated to thereby rotate the shaft 96. A dial plate 113 is secured to the outer face of the cover member 111 for cooperation with pointers 114 and 115 which are secured respectively to the knob 112 and to the sleeve 109. The sleeve 109 is radially slotted at its inner end, as indicated at 116, and this slot receives tongues 117 and 118 which extend upwardly from the annular externally toothed gear 119 which embraces the pin 103. This gear element 119 seats upon an eccentric disk 121 on the pin 103 and the eccentric fits closely within a circular recess in the under side of the gear. The teeth of the gear 119 mesh with the teeth of an internal gear element 122 which is held stationary on the fixed member 108. When the pin 103 is rotated the action of the eccentric 121 upon the gear element 119 causes that element to move in an annular path defined by the pitch circle of the internal gear 122, and in this movement to rotate about its own axis. This rotational movement of the gear 119 about its own axis at a rate greatly reduced below the rotational speed of the pin 103 is transmitted to the sleeve 109 by way of the tongues 117 and 118, and the slot 116 previously described so that the sleeve 109, and hence the pointer 115, is given a rotary movement having a fixed relation to the rotary movement of the knob 112 and pointer 114 but at a greatly reduced rate. The combined pointers 114 and 115, in conjunction with the dial 113 affords a means for determining the extent of any adjustment of the crank pin 87 and the position of the crank pin corresponding to any given position of the knob 112.

The cylindrical projection 106 also houses a device identical to that described above which operatively connects pin 104 with knob 112a. Because of the interconnecting gear train 99—101 and 102, any adjustment of either of the knobs 112, 112a results in a corresponding adjustment of the other. This affords greater convenience to the operator since under certain conditions it will be necessary to make adjustments between the start and finish of some cuts.

With reference to Fig. 6, it will be noted that a rectangular shaft 125 is journaled at one end in a bearing 126 in the interior of a tube 63, said shaft extending radially from the tube and having its outer end journaled in a suitable bearing 127 in a transverse arm 128 at the outer end of the arm 84. The inner end of the shaft 125 carries a sprocket 129 which is connected by a chain 131 with a sprocket 132 at the inner end of a pin 134 supported in the tube 63. The pin 134 extends through a hollow cylindrical projection 135 extending radially from the tube 63, the inner end of the pin being supported in a bearing 136 in the inner end of the projection 135, and the pin being supported at its outer end in a second bearing 137 in the outer end of the projection. The pin extends outwardly through a cover member 138 on the outer end of the projection and has a suitable knob or handle 139 on its outer end by means of which the pin may be rotated. A retractable locking pin 141 is mounted in the cover 138 for locking the pin 134 in adjusted position. It will be apparent that by manipulation of the knob 139, the shaft 125 may be rotated in its bearings.

Slidably mounted on the shaft 125 is a sprocket 142. This sprocket is closely confined between the sides 143 and 144 of a box-like arm 145 extending transversely from the block 86. The arm 145 also embraces between the said sides 143 and 144 a second sprocket 146, which is carried on a nut 147 on the shaft 93. Sufficient clearance is provided between the faces of the nut 147 and the inner faces of the side walls 143 and 144 of the arm 145 to avoid interference between the nut and the arm while the block 86 is being adjusted radially by rotative movement of the threaded shaft 93. Under these conditions the nut 147 will be locked against rotation, due to the fact that the shaft 125 is locked by the locking pin 141, and the nut 147 will move axially of the shaft 93 with and at the same rate as the block 86. When the block has reached its adjusted position, however, the nut 147 may be rotated on the shaft 93 by manipulation of the pin 134, after retraction of the locking pin 141, so that the nut may be jammed tightly against the inner face of one of the sides 143 and 144 of the arm 145 to thereby function as a lock nut immobilizing the block 86 and therefor the crank pin 87.

With reference again to Fig. 6, it will be noted that a ring gear 151 is secured to the face of the journal 79 around the tube 63, and that this gear meshes with a pair of beveled pinions 152 and 153 which are journaled on pins 154 and 155 projecting radially from a sleeve 156 secured to the tube 63. The idler pinions 152 and 153 mesh with a second ring gear 157 which is supported for rotation on the tube 63 and which carries a pointer arm 158, arranged for cooperation with a dial 159 on the confronting face of the casing member 161. This dial and pointer afford a means for visual indication of the angular position of the work piece with respect to a starting position at any point in the cutting operation.

Figure 11:
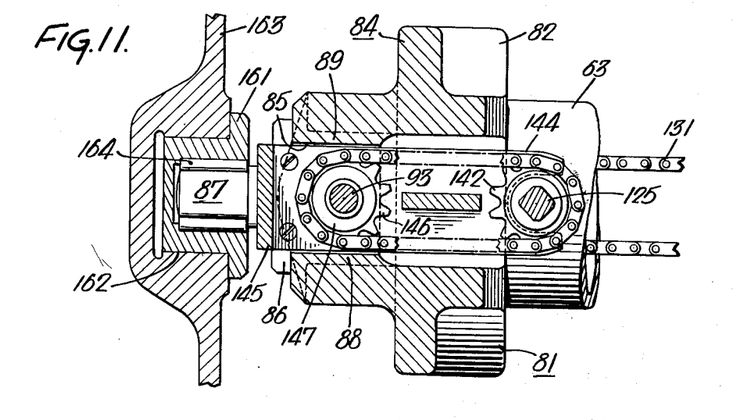
Fig. 11 is a sectional view on the line 11—11, Fig. 6.
Figure 12:
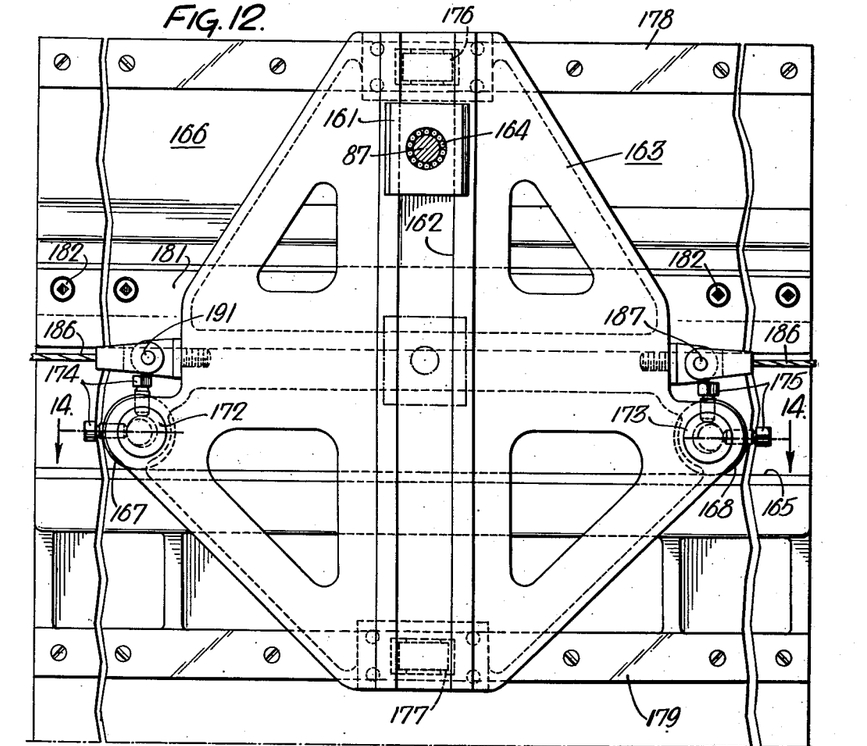
Fig. 12 is a sectional view on the line 12—12, Fig. 6.
Figure 13:
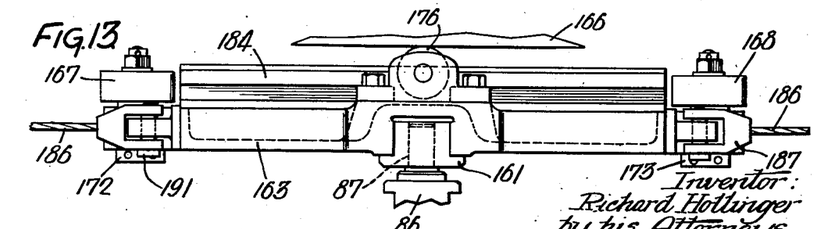
Fig. 13 is a top plan view of the crosshead appearing at the front of Fig. 12.
Figure 14:
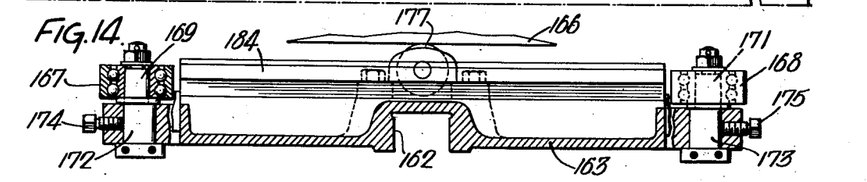
Fig. 14 is a sectional view on the line 14—14, Fig. 12.
Figure 15:
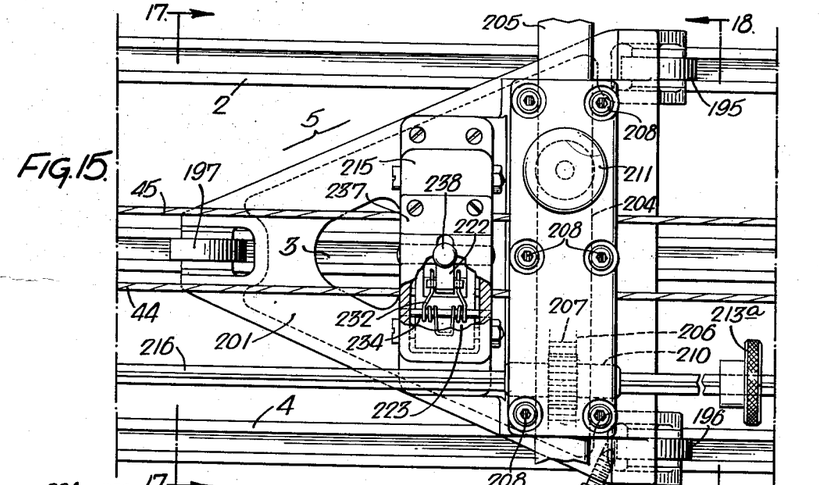
Fig. 15 is a top plan view of one of the cutting torch carriages.
Figure 16:
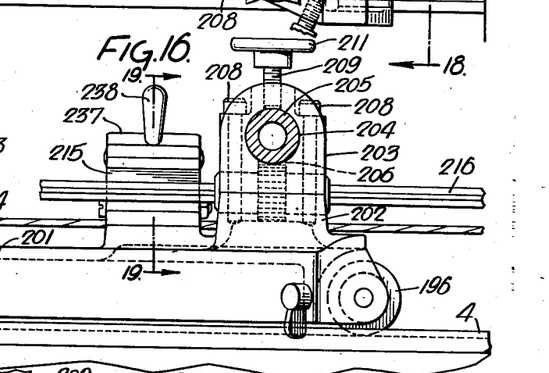
Fig. 16 is a side elevational view of the carriage shown in Fig. 15.

The crank pin 87 projects from the block 86 into a second block 161 (see Figs. 11 and 12) which block is slidably supported in a vertically disposed guide slot 162 in a cross-head member 163. As shown in Fig. 12, a suitable anti-friction bearing 164 may be interposed between the pin 87 and the block 161. The crosshead 163 is supported on a horizontal rail 165 which forms a part of the fixed structure of the frame 166 of the machine housed within the casing 43, said crosshead having rollers 167 and 168 at opposite sides thereof which travel on the rail and afford the crosshead a horizontal movement. As shown in Figs. 12 and 14, the rollers 167 and 168 are mounted on the eccentric outer ends 169 and 171 of pins 172 and 173, respectively, which are mounted for rotary adjustment in the body of the crosshead and which are normally fixed in the crosshead by set screws 174 and 175. Rotation of the pins 172 and 173 will thereby effect a translational adjustment of the rollers with respect to the crosshead.

The crosshead has at the top and bottom respectively thereof a pair of rollers 176 and 177 mounted on vertical axes which are arranged for engagement respectively with the vertical faces of horizontal rails 178 and 179 at top and bottom respectively of the frame 166. The crosshead is secured against movements away from the face of the supporting frame by means of a rail 181 which is secured by screws 182 to the face of the frame 166 and which has a depending flange 183 which interlocks slidably with a clamp element 184 secured to the rear center part of the crosshead by means of screws 185.

Figures 4, 5:
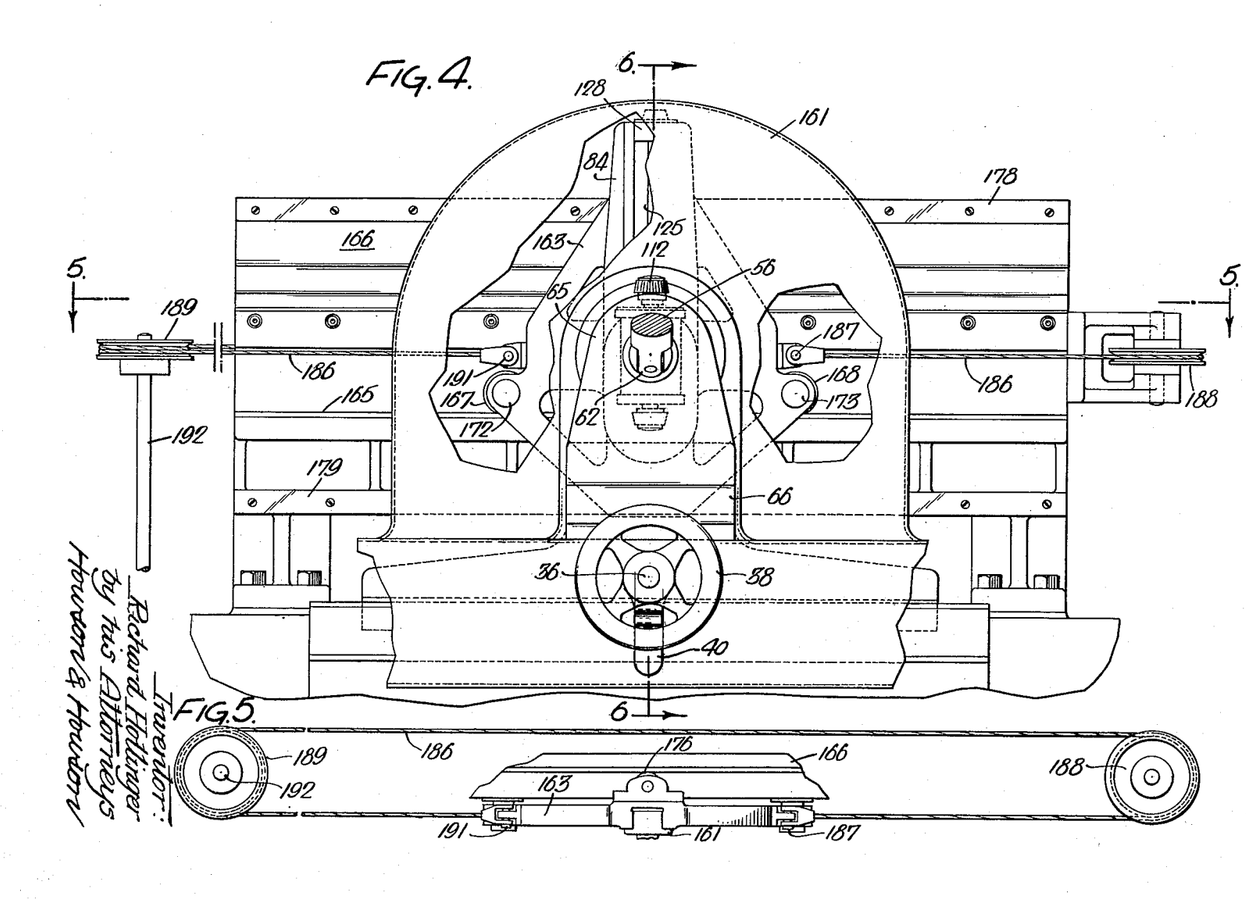
Fig. 4 is an elevational view as observed from the line 4—4, Fig. 3.
Fig. 5 is a sectional view on the line 5—5, Fig. 4.

It will be apparent that rotation of the tube 63, by reason of the connection afforded by the crank pin 87 and the sliding block 161 of the crosshead, will effect a horizontal reciprocatory movement of the latter. As shown in Fig. 4, a cable 186 is secured at one end 187 to one side of the crosshead, this cable passing horizontally around a pulley 188 in the frame 166, then behind the crosshead and around a second pulley 189, the free end of the cable being secured at 191 to the proximate side of the crosshead. The pulley 189 is secured to the upper end of a shaft 192 which is suitably supported in the frame and which carries at its lower end the pulley 42 previously referred to. This establishes an operative connection between the crosshead and the burner-actuating cable 41 and thereby between the burners and the work piece itself to which the crosshead 163 is operatively connected by the train of mechanism described above. This obtains a precise synchronization of the movements of the work piece W and the burner nozzles 34 and 35.

While the pulleys 189 and 42 are shown to be of equal size so that any translated movement between the crosshead 163 and burner carriages is of equal amplitude, these may be made interchangeable with pulleys having other ratios, thus varying the relative linear travel of crosshead and burner carriage. For instance, the effective linear traverse of the burner carriages may be increased by simply substituting for pulley 42 one of larger size than shown. In this manner the overall range of the machine is measurably increased, since for a given kind of cut the linear travel of the burner carriages varies as the pipe diameter, and an increase in traverse distance will correspondingly permit accommodation of larger sizes.

While pulleys are presently shown it will be obvious that suitable change gearing between the cable runs 186 and 44 might be used to effect the same result.

As previously set forth, means is provided for selectively attaching the carriages 5 and 6 to the opposite runs 44 and 45 of the cable 41. With reference particularly to Figs. 15 to 23 of the drawings, it will be noted that the carriages are substantially triangular in form with a wheel 195 and 196 at the respective base corners of the carriage and a third wheel 197 at the apex. These wheels travel in the rails 2, 3 and 4 respectively, the rails being channeled so as to retain and guide the wheels and to maintain the carriage in the normal path parallel to the work-supporting rolls 7 and 8. The carriage comprises a substantially triangular bed plate 201 at the corners of which the aforesaid wheels are journaled, and the said bed plate has at its wider end an elevated support 202 for the nozzle element 34. At the top of the support is a member 203 having a transverse cylindrical seat 204 for reception of the cylindrical body 205 of the burner element 34, the cylindrical seat or bore having at the bottom thereof a straight sided recess 206 which receives a rack 207 at the bottom of the burner body 205. The member 203 is secured in the carriage by screws 208, and has at the top thereof a set screw 209 which extends into the top of the cylindrical seat 204, said set screw having a wheel 211 at the top thereof by means of which the screw may be turned down upon the body 205 of the burner element 34 to lock the element in adjusted position. The burner element may be adjusted longitudinally in the seat 204 by means of a pinion 212 which is mounted in a milled slot in the support 202 for engagement with the rack 207. The pinion shaft 210 is provided with a rectangular socket and may be rotated through the medium of a key 213, shown in Fig. 22, to adjust the burner element as may be required to bring the nozzle tip into proper operative position with respect to the work.

When two or more burners are required in operation simultaneously, a burner adjustment control shaft 216 is provided carrying a hand wheel 213a slidably positioned thereon. The shaft 216 in turn has sliding engagement with the pinion shafts 210, 210 of the several burner carriages. Thus, individual longitudinal movement of the carriages on the rail is not interfered with and synchronized control of all the burner tips with respect to the work W is afforded at all times.

Figure 19:
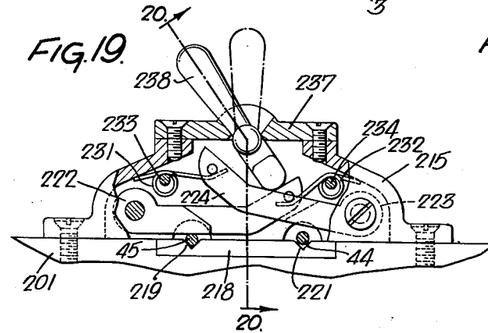
Fig. 19 is an enlarged sectional view on the line 19—19, Fig. 16.
Figure 20:
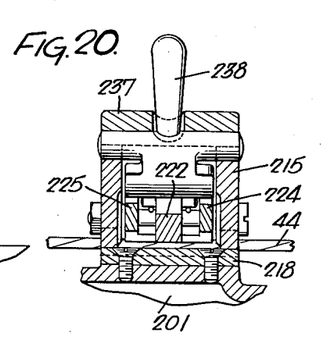
Fig. 20 is a sectional view on the line 20—20, Fig. 19.
Figure 21:
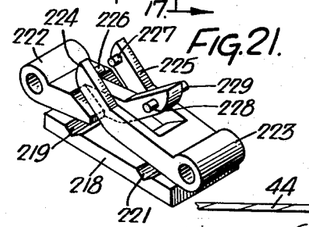
Fig. 21 is a detached perspective view of the primary elements of the carriage locking device.

Secured to the top of the bed plate 201 is a casing 215 which houses the elements of the device for clamping the carriage to one or other run of the cable 41. Said runs 44 and 45 of the cable pass under the burner support 202 and through openings in the side walls of the casing 215. Within the casing is a plate 218 having notches 219 and 221, respectively, through or immediately over which the cable runs pass. Pivotally supported in the casing 215 at opposite ends respectively of the plate 218 is a pair of clamping arms designated respectively by the reference numerals 222 and 223, these arms extending inwardly toward each other and over the plate 218 as best illustrated in Fig. 21. As therein shown, the body of the clamping arm 223 immediately overlies the groove 221, while the arm 222 bears a corresponding relationship to the groove 219. The arm 223 is bifurcated as indicated at 224 and 225 and each of these bifurcations carries an inwardly projecting pin, 226 and 227 respectively, which project inwardly in axial alignment with each other. The arm 222 extends between the bifurcations of the arm 223, and the end of the arm 222 carries a pair of outwardly projecting pins 228 and 229 respectively. The pins of both clamping arms form retainers for the ends of springs 231 and 232 which are supported respectively on pins 233 and 234 in the casing and whose other ends bear against the casing as best illustrated in Fig. 19. These springs tend to hold the free ends of the clamping arms 222 and 223 in an elevated position above the cable runs 44 and 45 shown in Figs. 17 and 19.

Figure 17:
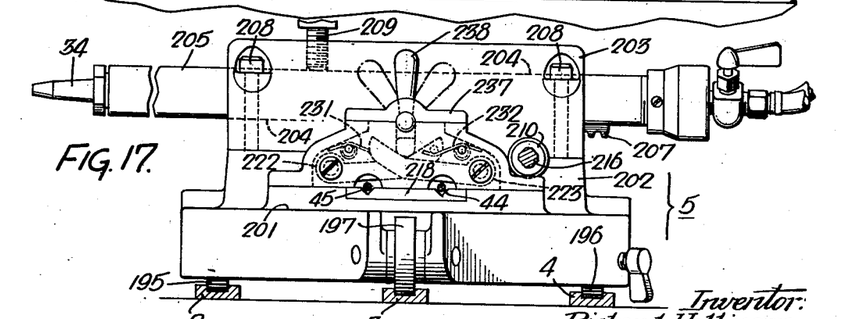
Fig. 17 is a sectional view on the line 17—17, Fig 15.
Figures 18, 22:
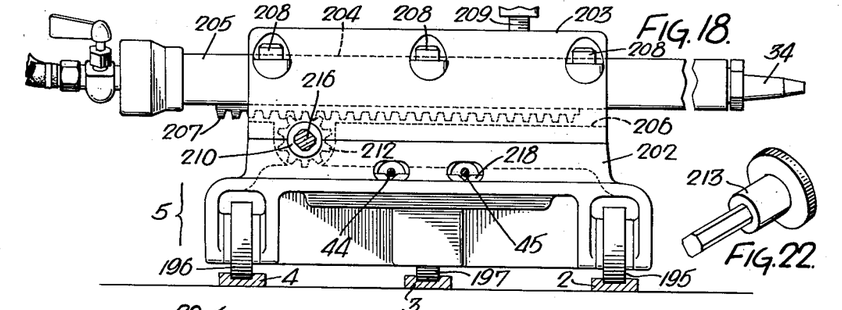
Fig. 18 is a sectional view on the line 18—18, Fig. 15.
Fig. 22 is a detached view in perspective of one of the torch adjusting keys.

Pivotally mounted in a detachable cover plate 237 at the top of the casing 215 is a lever 238, the lower end of which is adapted to engage, selectively, the upper ends of the arms 222 and 223. When the lever 238 is in the vertical position, as shown in Fig. 17, it lies in the notch between the upturned ends of the arms and permits the arms to assume relatively elevated positions under pressure of the springs 231 and 232 in which the cable runs 44 and 45 are free to pass through the carriage. When the lever is swung to the position shown in Fig. 19 it will engage the free upper end of the arm 222 and will force that arm downwardly on its pivot so as to press the underlying run 45 of the cable into the notch 219 and to thereby clamp the carriage to the cable so that it is compelled to move with the latter. When the lever 238 is swung over to the opposite position through the neutral vertical plane, it releases the arm 222 and forces the arm 223 downwardly so as to clamp the run 44 of the cable. In each of the operative positions, the angle of the lever, with respect to the direction of thrust exerted through the arm 222 or 223 as the case may be, is such as to tend to hold the lever in the particular operative position.

The operation of the device will be readily understood from the foregoing description. If it be desired, for example, to form a pipe fitting of the form shown in Fig. 27, cutting the sections of the fitting from a single length of pipe as illustrated in Figs. 1 and 28, the cut may be initiated with the setting of the machine illustrated in Fig. 1. In this setting the tips of the torches are directed against the side of the pipe at point T, T on a line representing the intersection of the wall of the pipe by a horizontal plane which contains the rotary axis of the pipe. Adjustment of the work piece to this position may be readily effected by adjustment of the roller 8. The bracket 66 has been adjusted by manipulation of hand wheel 38 to bring the axis of tube 63 into a vertical plane containing the axis of the work piece, and the crank arm 81 is vertical so that the axis of the crank pin is in said vertical plane. In this position it will be noted that the carriages 5 and 6 are positioned centrally of the machine with the torches separated to an extent corresponding to the minimum axial length of the intermediate section 241 of the aforesaid fitting, plus the throw of the crank pin 87.

Figure 23:
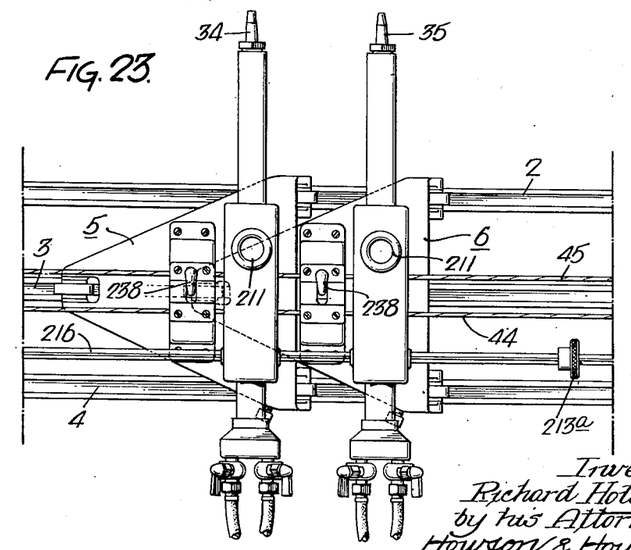
Fig. 23 is a top plan view of two of the torch carriages illustrating the manner in which they may be brought into overlapping relation.

It will be noted by reference to Fig. 23 that the carriages are constructed so as to permit them to be brought together to an extent less than the overall length of the individual carriage. By reason of the fact that the apex portions of the bed plate 201 are slightly depressed below the rear portions of the bed plate, the apex portion of one carriage may pass under the rear elevated portion of the other as illustrated in Fig. 23.

In initiating the cut, the burners are moved inwardly toward the work so that the tips lie in proper operative proximity to the latter; and the driving roller 8 is then set in operation to rotate the pipe. Assuming that in the present instance the pipe is rotated in a clockwise direction, as viewed from the near end in Fig. 1, rotation of the work will then cause the carriages 5 and 6 to move away from each other so that the cut will follow the line of intersection of the pipe by a plane inclined to the axis of the pipe, the angle of inclination depending on the radial distance of the crank pin 87 from the axis of the tube. A 90° rotation of the work pipe 7 will carry the crosshead 163 from a central position to the end of its travel in one direction and continued movement of the pipe beyond this point results in a reversal of the crosshead, and a reversal also in the directions of movement of the carriages 5 and 6. This movement of the crosshead continues past the said central position to the opposite end of its path of travel, and during the same interval the work pipe will rotate through 180°. At this point, the movement of the crosshead is again reversed with consequent reversal of the carriages 5 and 6 so that both the crosshead and carriages are brought to their original positions simultaneously with the completion of a 360° movement of the work. In this operation, the work piece will be divided into three sections 241, 242, and 243 along two diagonal lines 250 and 251, as indicated in Fig. 1, each line defining a plane of intersection and said planes being inclined in opposite directions but equal angles from an imaginary intermediate plane 252 normal to the work axis (see Fig. 28). By then rotating the end sections each through an angle of 180° and welding the sections together along the cut edges, a fitting of the form illustrated in Fig. 27 will be obtained.

Figure 31:
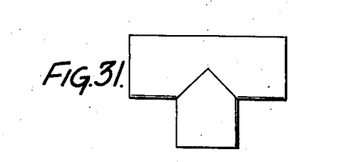
Figure 32:
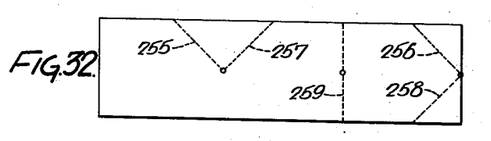

By connecting the carriages simultaneously to the same run of the actuating cable, a pipe section may be divided into three parts on intersecting planes indicated by the broken lines 253 and 254 in Fig. 30 to produce a fitting of the form shown in Fig. 29. For fittings of the character shown in Fig. 31, a pipe section must be divided along lines or in planes indicated in Fig. 32. The cuts 255 and 256 may be made simultaneously; or the cut 257 may be made simultaneously with the cut 256 employing the principles outlined above. The cuts 258 and 259 may also be made simultaneously with one of the carriages stationary for the latter cut and the other carriage moving with one of the runs of the actuating cable.

Figure 33:
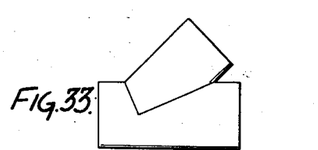
Figure 34:
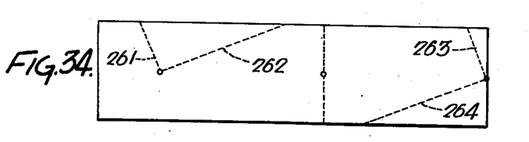

A similar principle may be used for cutting the pipe shown in Fig. 34 into the two parts necessary to produce the fitting shown in Fig. 33, it being noted that in this case the throw of the crank pin must be adjusted between the cuts 261, 262 and the cuts 263, 264.

There may be considerable modification in detail without departure from the principles of the invention as defined in the claims. In Fig. 35, for example, I have illustrated an alternative means for supporting the work for rotation in the machine. In this case, two tapered plugs 271 and 272 are mounted in confronting relatively spaced relation on shafts 273 and 274 respectively, said shafts being journaled in axially aligned journals 275 and 276 at opposite ends of the machine. The plugs 271 and 272 are adapted to fit securely into the ends of the work pipe 277 and to support the pipes on and in axial alignment with the shafts as illustrated. The shaft 274 is fixed axially, and the shaft 273 is axially movable, being mounted in the present instance on a carriage 278 which is supported on wheels 279 for guided movement to and from the end of the pipe 277 and axially of the shaft 273.

The work is brought between the plugs 271 and 272 on a wheeled truck 281, said truck having cradle means 282 to retain the work pipe in stable position thereon. The carriage 278 is then advanced to bring the plug 272 into close proximity to the work pipe. Shaft 273 which in effect constitutes the ram of a hydraulic unit 280 is advanced under fluid pressure to press the plugs into the ends of the pipe. The plugs are tapered and self-centering and, when pressed into the ends of the pipe, elevate the latter slightly above the cradle 282 so as to avoid frictional resistance to rotation of the work. The carriage 278 is held in the advanced operative position by suitable means such as a pawl 283 on the carriage and a fixed cooperating ratchet 284.

Rotation of the work is effected in the present instance by driving the plug 271 by means of a bull gear 285 attached thereto from any suitable source of power (not shown). The plug 272 mounted for rotational movement on its bearing 286 carried on the end of shaft 273 meanwhile continuing to support the work by means of the cylinder 280 and holding pawl 283.

In other respects the machine may correspond to that previously described, the shaft 274 being connected by suitable coupling means to the tubular shaft 63 or its equivalent.

I claim:

1. In a pipe cutting machine a support for the work and means for rotating the work on said support about its own tubular axis, guide means at one side of said support extending parallel to said axis, a carriage movable on said guide, a cutting torch mounted on the carriage in operative relation to the work, and means including a mechanical transmission connecting the work with the carriage for advancing the carriage on the guide, said transmission including a crank shaft connected to the work, a crank arm extending radially from said shaft, a crank pin adjustable radially in said arm, a reciprocatory crosshead engaging the pin and means for connecting the crosshead to the said advancing means, said crank pin being carried on a block slidably supported in the crank arm and said crank arm being provided with a threaded shaft journalled for rotation in the arm in threaded engagement with the block, means for rotating said threaded shaft to adjust the block in the crank arm, and means operatively associated with the said adjusting means for indicating the extent of said adjustment.

2. A pipe cutting machine according to claim 1 wherein the said flexible connecting means comprises a pair of telescopic shaft sections flexibly connected respectively to the first named shaft and the edge of the work, and two sets of pivotally connected arms, the free end of one arm of each set being pivotally connected to one of the said shaft sections, and the free end of the other arm of each set being pivotally connected to the other of the shaft sections so as to afford a rotary connection between the shaft sections free from backlash.

3. A pipe cutting machine according to claim 1 wherein the crank shaft is hollow, and wherein further the threaded shaft rotating means comprises an inner shaft journaled in the crank shaft and operatively connected with the threaded shaft.

4. A pipe cutting machine according to claim 3 wherein means is provided on the exterior of the crank shaft for rotating the said inner shaft.

5. A pipe cutting machine according to claim 4 wherein means is provided in association with the said means for rotating the inner shaft for indicating the position of the crank pin.

6. In a pipe cutting machine a support for the work and means for rotating the work on said support about its own tubular axis, guide means at one side of said support extending parallel to said axis, a carriage movable on said guide, a cutting torch mounted on the carriage in operative relation to the work, and means including a mechanical transmission connecting the work with the carriage for advancing the carriage on the guide, said transmission including a crank shaft connected to the work, a crank arm extending radially from said shaft, a crank pin adjustable radially in said arm, a reciprocatory crosshead connected to the pin and means for connecting the crosshead to the said advancing means, said crank pin being carried by a block slidably mounted in the crank arm, a threaded shaft carried by the arm and engaged in a threaded opening in the block, said shaft being rotatable to adjust the block in the arm, a nut on the shaft adjustable into engagement with the block to lock the shaft and the said block in adjusted position, a means for adjusting the nut, said means including a nut adjusting shaft journaled for rotation in the crank shaft and paralleling the crank arm, a sprocket slidably mounted for longitudinal movement on the said adjustable shaft and rotatable with the latter, a sprocket on the said nut, a chain connecting the sprockets, and means for turning the said adjusted shaft.

7. A pipe cutting machine according to claim 6 wherein the crank shaft is hollow, and wherein the means for turning the nut-adjusting shaft includes actuating elements mounted in the interior of said hollow shaft.

8. A pipe cutting machine according to claim 7 including means for immobilizing the nut-adjusting shaft.

9. In a pipe cutting machine a support for the work and means for rotating the work on said support about its own tubular axis; guide means at one side of said support extending parallel to said axis, said guide means comprising three parallel rails; at least two carriages movable on said rails, each carriage being triangular in form and having a single wheel at one end for engagement with the intermediate of the rails and two wheels at the other end for engagement, respectively, with the outer rails, the end of the carriage supported by the two wheels being relatively elevated so as to permit passage thereunder of the opposite end of a second carriage of like form and its single supporting wheel; a cutting torch mounted on each carriage and adjustable into operative relation to the work; means common to all said torches for advancing and retracting the torches on the carriages relative to the work; and means actuated by the work for advancing each carriage on the rails, said means including cable elements traveling in opposite directions and parallel to the rails, together with means for selectively connecting each said carriage to either of said elements.

References Cited in the file of this patent

UNITED STATES PATENTS

| Number | Name | Date |
|---|---|---|
| 1,774,000 | Hand | Aug. 26, 1930 |
| 1,954,549 | Twigg et al. | Apr. 10, 1934 |
| 1,963,537 | Tweit | June 19, 1934 |
| 2,089,840 | Rockefeller | Aug. 10, 1937 |
| 2,138,676 | Hull et al. | Nov. 29, 1938 |
| 2,148,780 | Seymour | Feb. 28, 1939 |
| 2,189,203 | Glynn | Feb. 6, 1940 |
| 2,295,182 | Norton | Sept. 8, 1942 |
| 2,481,421 | Hayes | Sept. 6, 1949 |
| 2,495,360 | Young | Jan. 24, 1950 |
| 2,500,204 | Ronay | Mar. 14, 1950 |

FOREIGN PATENTS

| Number | Country | Date |
|---|---|---|
| 135,962 | Austria | Dec. 27, 1933 |